US008483626B2

(12) United States Patent
Gupta

(10) Patent No.: US 8,483,626 B2
(45) Date of Patent: Jul. 9, 2013

(54) SOFTWARE-DEFINED RADIO

(75) Inventor: Dev V. Gupta, Concord, MA (US)

(73) Assignee: Newlans, Inc., Acton, MA (US)

( * ) Notice: Subject to any disclaimer, the term of this patent is extended or adjusted under 35 U.S.C. 154(b) by 194 days.

(21) Appl. No.: 13/175,260

(22) Filed: Jul. 1, 2011

(65) Prior Publication Data

US 2012/0001660 A1    Jan. 5, 2012

Related U.S. Application Data

(60) Provisional application No. 61/360,579, filed on Jul. 1, 2010.

(51) Int. Cl.
*H04B 1/40* (2006.01)
*H04B 1/10* (2006.01)
*H04B 1/16* (2006.01)
*H04B 1/04* (2006.01)

(52) U.S. Cl.
USPC ............. 455/76; 455/266; 455/307; 455/339; 455/125; 455/340

(58) Field of Classification Search
USPC .................... 455/76, 307, 339, 125, 340, 266
See application file for complete search history.

(56) References Cited

U.S. PATENT DOCUMENTS

| | | | |
|---|---|---|---|
| 7,203,466 B2 * | 4/2007 | Muschallik et al. | 455/86 |
| 7,437,139 B2 * | 10/2008 | Lo et al. | 455/340 |
| 2001/0024498 A1 * | 9/2001 | Joffe | 379/406.01 |
| 2009/0115912 A1 * | 5/2009 | Liou et al. | 348/726 |
| 2010/0246635 A1 * | 9/2010 | Ye et al. | 375/130 |
| 2011/0051782 A1 | 3/2011 | Gupta et al. | |

OTHER PUBLICATIONS

"U.S. and Worldwide Mobile Phone Shipments," *WirelessWeek*, p. 38 (Apr. 2009).
Leimer, A., "Software Defined Radio (SDR)/Cognitive Radio (CR) Technology," Presentation made at TCB Workshop, Santa Clara, 6 pages (May 2004).
Bains, S., "Analog's answer to FPGA opens filed to masses," 2 pages. [online], Feb. 2008 [retrieved on May 19, 2009]. Retrieved from the Internet URL: http://www.eetimes.com/showArticle.jhtml?articleID=205916545.
Frenzel, L.E., "11 Key Trends and Developments in the Mobile Market," *Mobile Development and Design*, 3 pages (Feb. 2009).
Maxim, "Filter Basics: Anti-Aliasing," Application Note 928, 8 pages (Jan. 2002).
Maxim, "The Basics of Anti-Aliasing: Using Switched Capacitor Filter," Application Note 3494, 8 pages (Apr. 2005).
Wang, C.-C., et. al., "A Gm-C Anti-Aliasing Filter Design with Digitally Tunable Bandwidth for DVB-T Receivers," *IEEE International Conference on Systems and Signals*, Atlanta, GA, pp. 985-989 (May 2005).

(Continued)

*Primary Examiner* — Andrew Wendell
*Assistant Examiner* — Maryam Soltanzadeh
(74) *Attorney, Agent, or Firm* — Hamilton, Brook, Smith & Reynolds, P.C.

(57) ABSTRACT

Present software-defined radios (SDR) employ front end circuits that contain multiple receivers and transmitters for each band of interest, which is inflexible, expensive and power inefficient. A programmable front end circuit is implemented on a CMOS device and is configurable to transmit and receive signals in a wide band of frequencies, thereby providing an adaptable transmitter and receiver operable with current and future wireless networking technologies.

8 Claims, 14 Drawing Sheets

OTHER PUBLICATIONS

Markel, R. and Sevastopoulos, N., Linear Technology, "Switched-Capacitor Low Pass Filters for Anti-Aliasing Applications," *Design Notes*, 2 pages (Oct. 1988).

Shi, C., et. al., "Design of a Low-Power CMOS Baseband Circuit for Wideband CDMA Testbed," International Symposium on Low Power Electronics and Design, Rapallo, Italy, pp. 222-224 (Jul. 2000).

Becher, D., et al., "Reliability Study of Low-Voltage RF MEMS Switches," GaAsMANTECH Conference, 4 pages (2002).

Citi—Industry Focus, Integration and Consolidation, 72 pages (Nov. 29, 2007).

Koch, P. and Prasad, R. "The Universal Handset," *IEEE Spectrum*, 6 pages, [online], Apr. 2009 [retrieved on May 25, 2009]. Retrieved from the Internet URL: http://www.spectrum.ieee.org/print/8267.

Gupta, D., et. al., "Interference Detection and Rejection in Ultra-Wideband Systems," *IEEE International Conference on Ultra-Wideband*, Hannover, Germany, 1:67-70 (Sep. 2008).

Entesari, K., "Development of High Performance 6-18 GHz Tunable/Switchable RF MEMS Filters and Their System Implications," Unpublished doctoral dissertation, University of Michigan, 173 pages (2006).

Nuttall, J., "The Convergence of Padé Approximants of Meromorphic Functions," *Journal of Mathematical Analysis and Applications*, 31:147-153 (1970).

Chandrahalim, H., et al., "Channel-Select Micromechanical Filters Using High-K Dielectrically Transduced MEMS Resonators," *MEMS*, Istanbul Turkey, p. 894-897 (Jan. 2006).

Jackson, P., et al., "What Makes a Netbook? Shifting Technologies and Industry Players Blue PC Category Boundaries," *Forrester Research, Inc.—For Consumer Product Strategy Professionals*, 9 pages (Feb. 2009).

Su, H.T., et al., "Performance of RF MEMS Switches At Low Temperature," *Electronics Letters*, 242(21) 2 pages (Oct. 2006).

Larson, L.E., "Microwave MEMS Technology for Next-Generation Wireless Communicatoins—Invited Paper," Center for Wireless Communications, *IEEE, MTT-S Digest*, p. 1073-1076 (1999).

Wei, J., et al., "A Programmable Complex FIR Filter with Integrated MEMS Filter for Front-end Charge Sampling Receiver," *IEEE*, p. 1125-1128 (2006).

Maxim, "A Beginners Guide to Filter Topologies," Application Note 1762, 6 pages (Sep. 2002).

Zheng, Y. and Saavedra, C. E., Feedforward-Regulated Cascode OTA for Gigahertz Applications,: *IEEE Transactions on Circuits and Systems—I: Regular Papers*, 55(11):3373-3382 (Dec. 2008).

Maxim, "A Filter Primer," Application Note 733, 20 pages (Oct. 2008).

Maxim, "Analog Filter Design Demystified," Application Note 1795, 9 pages (Feb. 2003).

Schlarmann, M. E., et. al., "A New Multipath Amplifier Design Technique for Enhancing Gain without Sacrificing Bandwidth," *IEEE International Symposium on Circuits and Systems*, 2:II-610-II-615 (Jul. 1999).

K. Bult and G. J. G. M. Geelen, "An Inherently Linear and Compact MOST-Only Current Division Technique," *IEEE Journal of Solid-State Circuits*, 21(12):1730-1735 (Dec. 1992).

Schneider, M. C., et. al., "Digitally Programmable V-1 Converter for Application in MOSFET-C Filters," *Electronics Letters*, 31(18):1526-1527 (Aug. 1995).

Waite, H., et. al., "A CDMA2000 Zero-IF Receiver with Low-Leakage Integrated Front-End," *IEEE Journal of Solid State Circuits*, 39(7):1175-1179 (Jul. 2004).

J. Sevenhans, et. al., "Trends in Silicon Radio Large Scale Integration: Zero IF Receiver! Zero I & Q Transmitter! Zero Discrete Passives!," *IEEE Communications Magazine*, pp. 142-147 (Jan. 2000).

Kenington, P.B., "Power Consumption of A/D Converter for Software Radio Application," *IEEE Transaction on Vehicular Technology*, 49(2):643-650 (Mar. 2000).

Berg, A., "Is the Smartphone Dead?," *Wireless Week*, 1 page (May 2009).

Ulasien, P., "Mobile Applications: State of the US Marketplace," *Faulkner Information Services*, 9 pages (Feb. 2009).

"Nokia Still Leads in 4Q Worldwide Smartphone Sales," *WirelessWeek*, p. 38 (Apr. 2009).

Bakhshi, S.K. and Vamas, R.T., "Worldwide Mobile Phone Forecast Update," *IDC Analyze the Future*, 24 pages (Sep. 2008).

Vigoda, B., "Analog Logic:Continuous-Time Analog Circuits Signal Processing," Doctoral Dissertation, Massachusetts Institute of Technology, MA, 209 pages (Sep. 2003).

Gulak, P. G., "Field-Programmable Analog Arrays: Past, Present, and Future Perspectives," *IEEE Proceedings of International Conference on Microelectronics*, pp. 123-126 (Nov. 1995).

Hall, T. S., "Field-Programmable Analog Arrays: A Floating-Gate Approach," Doctoral Dissertation, Georgia Institute of Technology, GA, 124 pages (Jul. 2004).

Hall, T. S., et. al., "Developing Large-Scale Field-Programmable Analog Arrays for Rapid Prototyping," *International Journal of Embedded Systems*, 1(3/4):179-198 (2005).

Cheow, L. F., et. al., "MEMS Filter with Voltage Tunable Center Frequency and Bandwidth," *Solid-State Sensors, Actuators and Microsystem Workshop*, Hilton Head Island, SC, pp. 304-307 (Jun. 2006).

Chandrahalim, H. and Bhave, S., "Digitally-Tunable MEMS Filter using Mechanically-Coupled Resonator Array," *IEEE International Conference on Micro Electro Mechanical Systems*, AZ, pp. 1020-1023 (Jan. 2008).

Chapman, M., "The Impact of MEMS on Cellular Phone Architecture," *Microwave Journal*, 4 pages (May 2006).

Nguyen, C. T. C., "MEMS Technology for Timing and Frequency Control," *IEEE Transactions on Ultrasonics, Ferroelectrics, and Frequency Control*, vol. 54, No. 2, 22 pages (Feb. 2007).

Maxim, "Filter Design Using Integrator Blocks," Application Note 727, 5 pages (Jan. 2001).

McCorquodale, M., et al., "An Integrated MEMS-BiCMOS Sincgars Transceiver," *Invited Paper, Design Automation Conference*, 7 pages (Jun. 2000).

Mercado, L.L., et al., "A Mechanical Approach to Overcome RF MEMS Switch Stiction Problem," *IEEE Electronic Components and Technology Conference*, pp. 377-384 (2003).

Meroño, J.T., "Integration of CMOS-MEMS resonators for radiofrequency applications in the VHF and UHF bands," Universitat Autònoma de Barcelona, Phd thesis, 223 pages (Jul. 4, 2007).

Mintel Oxygen "Home Personal Computers—US—Dec. 2008 Segments Performance—Laptops," 4 pages (Dec. 2008).

Mintel Oxygen "Market Re-forecasts: Technology—US—Apr. 2009 Home Personal Computers," 4 pages (Apr. 2009).

Narahashi, S., "Future Mobile Terminals and MEMS Technologies," *MEMS Executive Congress 2009*, Sonoma, California, 26 pages (Nov. 5, 2009).

Nguyen, C. T.-C., "Integrated Micromechanical Circuits for RF Front Ends," *Proceedings of the 36th European Solid State Device Research Conference*, Montreux, Switzerland, pp. 7-16 (Sep. 2006).

Nguyen, C. T.-C., "RF MEMS for Wireless Applications," *Conference, Device Research Conference*, Santa Barbara, California, pp. 9-12 (Jun. 2002).

Weinstein, D., et al., "Internal Dielectric Transduction of a 4.5 GHz Silicon Bar Resonator" *IEEE*, pp. 415-418 (2007).

Nguyen, C. T.-C., "MEMS Technologies and Devices for Single-Chip RF Front-ends (invited)," *2005 IMAPS/AAerS Int. Conf. on Ceramic Interconnect and Ceramic Microsystems Techonologies, Technical Digest*, Denver, Colorado, 9 pages (Apr. 2006).

Nuthall, P., "European Mobile Forecast: 2008 to 2013," *Forrester, Making Leaders Successful Every Day*, 14 pages (Mar. 14, 2008).

Okazaki, H., et al., "MEMS-based Reconfigurable RF Front-end Architecture for Future Band-free Mobile Terminals," *Proceedings of the 37th European Microwave Conference*, Munich, Germany, pp. 1058-1061 (Oct. 2007).

Pelino, M., "Enterprise Mobile User Forecast: Mobile 'Wannabes' Are the Fastest-Growing Segment," *Forrester Making Leaders Successful Every Day*, 12 pages (Oct. 9, 2008).

Rowe, M., Inside the Softransceiver—A sidebar accompanying ouro Sep. 2008 cover story, "An RFIC for the world," 2 pages [online], [retrieved on May 25, 2009]. Retrieved from the Internet URL: http://www.tmworld.com/index.asp?layout=articlePrint&articleID=CA6590875.

Seams, J., "R/2R Ladder Networks," Application Note AFD006, *Advanced Film Division*, 5 pages (Sep. 1998).

Smartphone Company Directory, 3 pages, [online], May 20, 2009 [retrieved on May 20, 2009]. Retrieved from the Internet URL: http://www.faulkner.com/products/faulknerlibrary/00011102.htm.

Sony, "Bandpass Filter Developed Using MEMS Technology Integration with Peripheral Circuits also Possible," (IEDM) International Electronic Device Meeting, 2 pages (Dec. 2005).

Strand, J., "Key Trends at the Mobile Word Congress 2009" 10 pages, [online], Mar. 9, 2009 [retrieved on May 17, 2009]. Retrieved from the Internet URL: http://www.mocom2020.com/2009/03/key-trends-mobile-word-congress/.

Yuan, M.J., "What is a Smartphone?—O'Reilly Media," 2 pages, [online], Aug. 2005 [retrieved on May 25, 2009]. Retrieved from the Internet URL: http://www.oreillynet.com/pub/a/wireless/2005/08/23/whatissmartphone.html[May 25, 2009 4:25:39 PM].

Wilson, C., et al., "PatentDocs—Software Definable Radio Trasnceiver with MEMS Filters," 9 pages, [online], Oct. 2, 2008 [retrieved on Jan. 8, 2009]. Retrieved from the Internet URL: http://www.faqs.org/patents/app/20080242239.

Kaajakari, V., "MEMS Turtorial: Mechanical Noice in Microelectromechanical Systems," p. 1-5. [online] Retrieved from the Internet URL: http://www.kaajakari.net/~ville/research/tutorials/tutorials.shtml.

Lee, S., et al., "Tunable MEMS Components with Applications to MEMS Filters," School of Electrical Engineering and Computer Science, Seoul National University, 5 pages.

Nguyen, C. T.-C., "Vibrating RF MEMS for Next Generation Wireless Applications," Center for Wireless Integrated Micro Systems (WIMS), 8 pages.

Yamashita, K., et al., "From Micromachines to MEMS—More than just components, these devices are now integrated into System LSIs." Sony Corporation, 2 pages.

* cited by examiner

CMOS front end IC

First- and second-order canonical forms of a state variable filter

Implementation of an arbitrary transfer function

Magnitude response of a realistic integrator (drawn in the log-log scale)

Pole shifting due to the non-ideal integrator response

Pole plots for the baseband and RF signals

Block diagram of a biquad

Cascaded biquads (example 8th order structure)

Circuit diagram of an integrator

Post layout calculated magnitude response of an integrator fabricated in 65 nm CMOS Post layout calculated phase response of an integrator fabricated in 65 nm CMOS Attenuator operation Block diagram of a 12-bit attenuator Post layout calculated magnitude response of an attenuator fabricated in 65 nm CMOS Post layout calculated phase response of an attenuator fabricated in 65 nm CMOS

- Input and output signals contain both the DC and AC terms
- R determines the current in the circuit and overall gain
- $g_m$ is the weighted sum
- $g_m$ proportional to the gate width $V_{out} = -(g_{m1} V_1 + g_{m2} V_2 + \ldots + g_{mN} V_N) \cdot R$ Circuit diagram of a summer Post layout calculated magnitude response of a summer fabricated in 65 nm CMOS Post layout calculated phase response of a summer fabricated in 65 nm CMOS

SOFTWARE-DEFINED RADIO

RELATED APPLICATION

This application claims the benefit of U.S. Provisional Application No. 61/360,579, filed on Jul. 1, 2010. The entire teachings of the above application are incorporated herein by reference.

BACKGROUND

A typical mobile phone handset includes a CMOS front end configured for operating with 3G or 4G transmit and receive frequencies. It contains four receivers, each covering a band allocated for cellular service. The two transmitters cover the corresponding bands. Beyond telecommunications transceivers, the phone typically contains separate Bluetooth, WiFi and GPS receivers, which add significantly to cost and consume a substantial amount of power. To address this problem, recently released front-end integrated circuits (ICs) include integrated GPS and WiFi transceivers. However, even with integrated receivers, front end ICs still require large, expensive and power intensive A/D converters and DSPs. Among the deficiencies of this architecture, it is not adaptive to new frequency allocations. New front end ICs must be developed to incorporate hardware changes to receiver and transmitter structures as services and frequency allocations evolve. Moreover, devices are unable to operate across different standards/geographies without redundant hardware, and adding incremental receiver and transmitter structures increases power consumption and cost.

As high data rate services become ubiquitous, power consumption and cost will increase greatly, as the digital components required for such services are prohibitively expensive and draw down power quickly. In a market calling for efficiency and low cost, the current mobile handset architecture is pushing the technology in the opposite direction.

SUMMARY

Embodiments of the invention provide a wideband programmable software defined radio (SDR) front end circuit. In an example embodiment, the front end circuit includes a frequency synthesizer to provide a clock signal having a variable frequency, a transmit path and a receive path. The transmit path includes a first anti-aliasing filter for receiving an analog signal, an upconverter to upconvert an output of the anti-aliasing filter according to the clock signal, and a first programmable bandpass filter to filter an output of the upconverter. The receive path includes a second programmable bandpass filter to filter a received signal, a downconverter to downconvert an output of the anti-aliasing filter according to the clock signal, and a second programmable anti-aliasing filter to filter an output of the downconverter.

In further embodiments, the front end circuit may further comprise a programmable transversal filter to provide echo cancellation of the transmit signal from the received signal. A combiner circuit may be configured to combine the received signal with an output of the transversal filter. A balanced hybrid circuit may be configured at both the transmit path and receive path, the hybrid circuit providing electrical symmetry between the transmit path and the receive path and limit transfer of energy from the transmit path to the receive path. Further, a roofing filter may be configured in the receive path to limit a frequency of the received signal to a selected bandwidth.

In still further embodiments, the various components of the SDR front end may include at least one programmable biquad circuit or a state variable filter. The biquad circuit may include at least one attenuator, integrator and summer.

The biquad attenuator may include a plurality of attenuator blocks, where each block comprises a first switch connected between a signal rail and an output node, a second switch connected between an offset rail and the output node, and a resistive element connected in series between the output node and the first and second switches.

The biquad integrator may include first and second p-channel transistors including respective sources coupled in parallel to a first voltage supply terminal and respective drains configured to provide complementary output signals. The integrator may further include first and second variable resistors including respective first terminals coupled to the drains of the first and second p-channel transistors, respectively, and respective second terminals coupled to gates of the second and first p-channel transistors, respectively. Lastly, the integrator may include first and second re-channel transistors including respective drains coupled to the second terminals of the first and second variable resistors, respectively, respective gates configured to receive complementary input signals, and respective sources in electrical communication with a second voltage supply terminal.

The biquad summer may include a plurality of N switches connected in parallel between an output node and a ground rail, a resistive element connected in series between a source rail and the output node, each of the switches being controlled by a respective voltage input.

BRIEF DESCRIPTION OF THE DRAWINGS

The foregoing will be apparent from the following more particular description of example embodiments of the invention, as illustrated in the accompanying drawings and appended slides in which like reference characters refer to the same parts throughout the different views. The drawings are not necessarily to scale, emphasis instead being placed upon illustrating embodiments of the present invention.

DETAILED DESCRIPTION

A description of example embodiments of the invention follows. The teachings of all patents, published applications and references cited herein are incorporated by reference in their entirety.

A software-defined radio (SDR) system is a radio communication system that implements in software components that have been typically implemented in hardware, such as filters, amplifiers, mixers and modulators. The software components are typically implemented on embedded computing devices or a personal computer.

Figure 1:
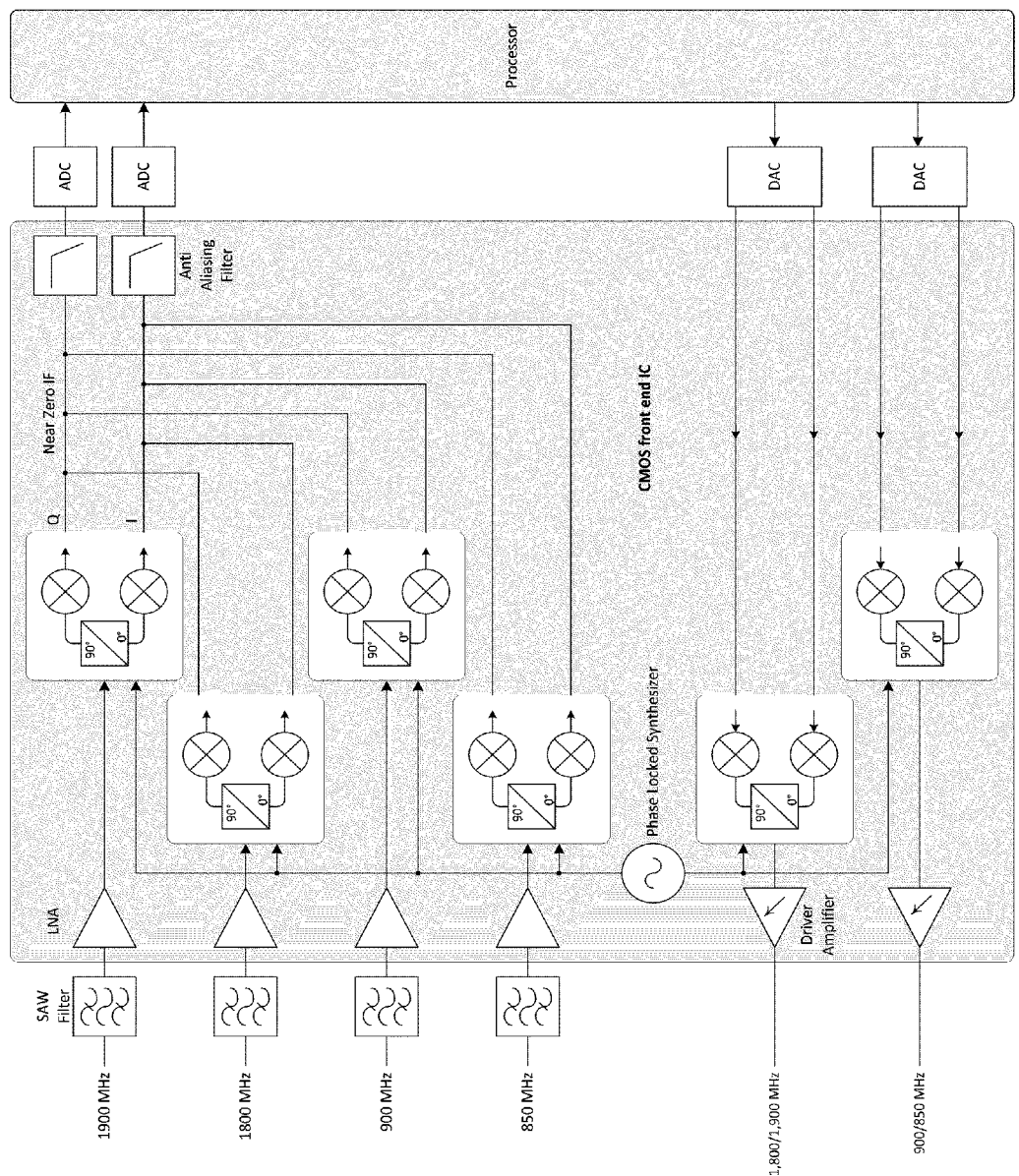
FIG. 1 is a block diagram of a prior art CMOS front end IC in a typical mobile phone handset.

FIG. 1 illustrates a typical CMOS radio-frequency (RF) front end of a mobile phone handset configured for operating with 3G or 4G transmit and receive frequencies. It contains four receivers, each covering a band (1900 MHz, 1800 MHz, 900 MHz, 850 MHz) allocated for cellular service. The two transmitters cover the corresponding bands. Beyond telecommunications transceivers, the phone typically contains separate Bluetooth, WiFi and GPS receivers, which add significantly to cost and consume a substantial amount of power.

SDR technology has matured considerably in the back end (consisting of digital circuits and the software), but the RF front end has not kept pace. This is because of the fragmented frequency allocation for specific given service. For example, the frequency allocation for 4G is shown in Table 1. The table includes only a few operating bands for illustration.

TABLE 1

Selected frequency allocations for LTE (Long Term Evolution)

| Operating Band | Uplink (MHz) BS[1] receive UE[2] transmit | | Downlink (MHz) BS transmit UE receive | | Duplex Mode |
|---|---|---|---|---|---|
| | $F_{UL\_low}$ | $F_{UL\_high}$ | $F_{DL\_low}$ | $F_{DL\_high}$ | |
| 1 | 1,920 | 1,980 | 2,110 | 2,170 | FDD |
| 2 | 1,850 | 1,910 | 1,930 | 1,990 | FDD |
| 3 | 1,710 | 1,785 | 1,805 | 1,880 | FDD |
| 4 | 1,710 | 1,755 | 2,110 | 2,155 | FDD |
| 5 | 824 | 849 | 869 | 894 | FDD |
| 6 | 830 | 840 | 875 | 885 | FDD |
| 7 | 2,500 | 2,570 | 2,620 | 2,690 | FDD |
| 8 | 880 | 915 | 925 | 960 | FDD |
| 9 | 1,749.9 | 1,784.9 | 1,844.9 | 1,879.9 | FDD |
| 10 | 1,710 | 1,770 | 2,110 | 2,170 | FDD |
| 11 | 1,428 | 1,447.9 | 1,475.9 | 1,495.9 | FDD |
| 12 | 698 | 716 | 728 | 746 | FDD |
| 17 | 704 | 716 | 734 | 746 | FDD |
| 40 | 2,300 | 2,400 | 2,300 | 2,400 | TDD |

[1]Base Station
[2]User Equipment - handset is an example of UE

As shown in FIG. 1, the prior art front end employs multiple receivers and multiple transmitters to cover the bands in the above table. This translates to high power consumption, cost and size.

Digital devices such as field programmable gate array (FPGA) and analog-to-digital converters (ADC) cannot operate over large bandwidths or data rates because of the Nyquist criteria. Their power consumption increases with the sampling rate. This translates to expensive thermal management solutions to lower the junction temperature of the device and improve its reliability. For instance, a decrease of 10° C. in operating temperature of the device doubles its component life. High power consumption also translates to implementation cost which is typically between $0.50 and $1.00 per Watt. Large number of gates in the FGPA contributes to propagation delay.

Embodiments of this invention address two problems faced by the next generation of handsets operating from 400 MHz to 6 GHz. Handsets operate across multiple bands and offer wideband services. Therefore, the prior art CMOS IC contains multiple receivers and transmitters for each band of interest. Such architecture is expensive and inflexible to accommodate future frequency allocations. In addition, processing high data rate at the Nyquist rate consumes considerable power. This translates to high cost, poor device reliability and short battery life.

Comparable prior art analog signal processors are either narrow band or adopt stochastic implementation, and fail to deliver a wideband and deterministic analog signal process. Such processors cannot provide an adaptive filter from 400 MHz to 6 GHz, and a prior art switched capacitor filter does not offer wideband coverage and suffers from problems caused by the presence of the periodic clocking signal.

Figure 2:
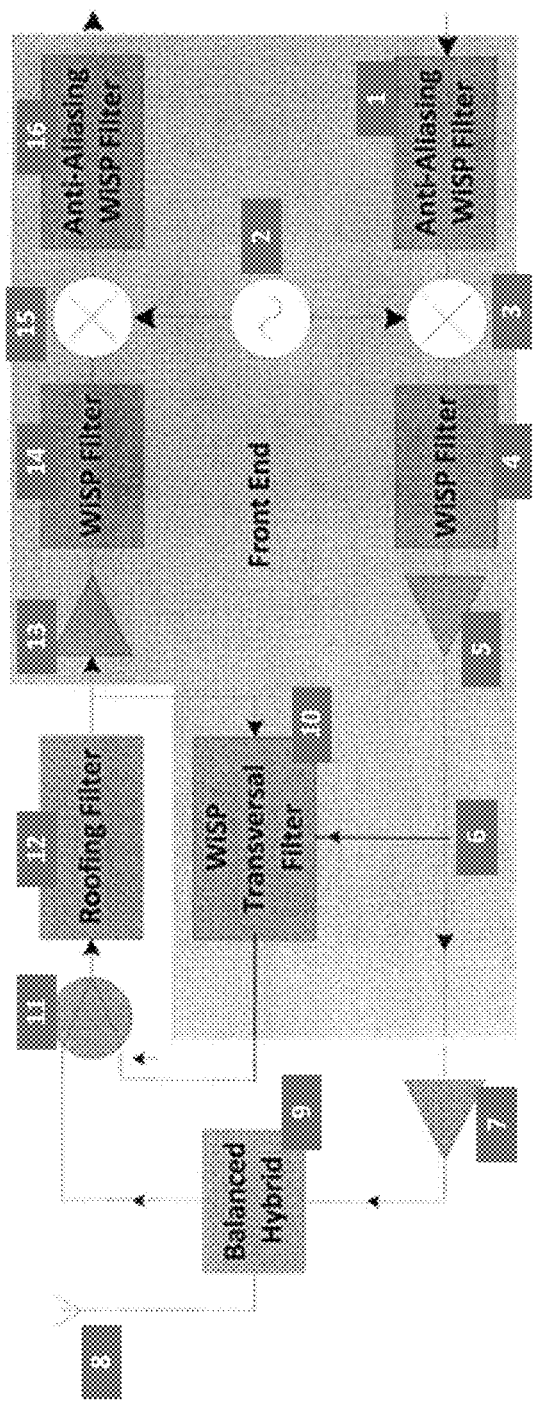
FIG. 2 is a block diagram of an example CMOS front end IC according to one embodiment.

FIG. 2 is a top-level block diagram of a wideband programmable SDR front end in one embodiment of the present invention. The front end may be implemented on a CMOS and SiGe device for low transmit power levels. For high transmit power levels, some components may be located off-chip. Embodiments of the SDR front end can be configured for use in a software defined radio, a spectrum analyzer, an early warning radar system, or in any other application where wideband filtering and signal processing is required. Other embodiments can be used in handsets for cellular telephone use. Operation of the front end is described below.

In the transmit path, an anti-aliasing filter 1 receives an input signal from a digital-to-analog converter (DAC) or I/Q DACSs (not shown). The output from the anti-aliasing filter drives an upconverter mixer 3 where the local oscillator frequency is provided by a frequency synthesizer 2. A programmable band pass filter 4 rejects unwanted sideband and harmonic content from the output of the upconverter 3. The passband characteristics of this filter can be changed under software control such that it offers low loss insertion loss to the transmit frequency, which is determined by the synthesizer 2.

The output of the bandpass filter 4 drives an amplifier driver 5, which typically operates in the linear region and, therefore, does not contribute to the spectral regrowth or non linearization of the amplifier driver. The output from the amplifier driver 5 drives the power amplifier 7, which may be implemented as a component external to the front end.

The balanced hybrid circuit 9 is an external component configured to limit the bandwidth of the signal. It offers a low loss path from the output of the power amplifier 7 to the antenna 8 and high insertion loss (or high isolation) to the path from the power amplifier to the combiner 11. The balanced hybrid 9 offers a low insertion path to the received signal from the antenna to the combiner. The balanced hybrid 9 may not provide acceptable isolation of the transmit power leaking into the low noise amplifier 11. An isolation of about 70 dB is required, whereas the balanced hybrid may provide an isolation of about 20 to 30 dB across the operating frequency range.

Accordingly, additional isolation is provided by utilizing the coupler 6, transversal filter 10 and combiner 11. The coupler 6 couples the transmitted signal to the transversal filter 10. The transversal filter 10 also receives input from the output of the roofing filter 12. This received signal also contains the transmit signal leaking into the receiver. The transversal filter 12 correlates the two inputs, and adapts the coefficients of the transversal filters to make the correlation disappear. It creates an estimation of the transmit signal leak into the receive signal, which the combiner 11 then combines with the hybrid 9 output to cancel the leak. The transversal filter 10 functions in continuous time, and the cancellation of the transmit power into the receiver also occurs in continuous time.

In the receive path, a low noise amplifier 13 is a wide band device that operates across the operating range of the SDR front end. Therefore, it is susceptible to jamming from broad band noise of incoming signals at the antenna 8. The purpose of the roofing filter 12 is to prevent this from occurring. The roofing filter 12 has a fixed bandwidth of 40 MHz to 80 MHz, but this bandwidth (or the center frequency of the roofing filter) can be moved to any location in the operating range of the SDR front end. Therefore, at any given time, the low noise only noise amplifier only 'sees' a selected signal spectrum, the spectrum being selected according to the received signal frequency.

A programmable bandpass filter 14 further reduces the bandwidth of the incoming signal to the channel bandwidth of the desired receive signal. A downconverter mixer 15 downconverts the incoming RF signal from the low noise amplifier 13 to base band. The local oscillator frequency is provided by the synthesizer 2. The programmable anti-aliasing filter 16 is a low pass filter, the filter transfer characteristics of which can be changed under software control based on data rate and presence of interferer in the base band. The filter 16 is provided to maximize the sensitivity of the analog-to-digital converter.

The architecture and operation of the components of the SDR front end of FIG. 2 are described in further detail below, with reference to FIGS. 3-17. Additional description of these components may be found in International Application PCT/US11/24542, the entirety of which is incorporated herein by reference.

Analytical Framework: The State Variable Filter

Wideband Signal Processing (WiSP) is analog signal processing technology; that is, it implements programmable and executable analog computing over bandwidths from 50 MHz to 20 GHz or more. The underlying basis of WiSP is state variable theory, which, when combined with CMOS deep sub-micron technology, makes it possible to extend low-frequency signal processing techniques to micron and millimeter wavelengths. WiSP may be realized in complementary-metal-oxide-semiconductor (CMOS), silicon germanium (SiGe) technology, and silicon-on-insulator (SOI) technology.

WiSP is highly accurate because parameters of the state variable machines can be set to 10 bits of accuracy. WiSP is also frequency agile, as changing state variable parameters, such as gain, makes it possible to span the whole frequency band. For example, a state variable machine that is centered about a frequency of 1 GHz may be shifted to a frequency of 10 GHz just by changing the gain parameters. WiSP technology is suitable for both linear time invariant signal processing and time variant signal processing. State variable systems can be used in single input/output mode and in multiple input/multiple output (MIMO) mode—for example, in mimicking a MIMO wireless antenna system.

Figure 3:
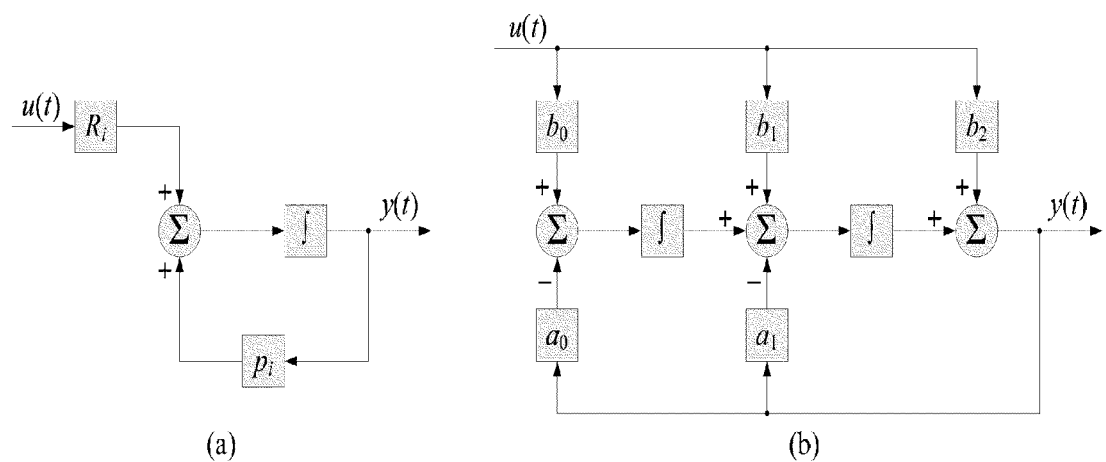
FIG. 3 shows first- and second-order canonical forms of a state variable filter.

FIG. 3 is a block diagram of first- and second-order canonical forms of a state variable filter (SVF). The SVA structure may be implemented in wideband signal processing. In particular, it may be configured to operate as one or more of the components in the front end circuit of FIG. 2, including the anti-aliasing filters, the bandpass filters, and the transversal filter. Such configuration is described below. When configuring the filter, it is an objective to implement an impulse response y(t) or equivalently a transfer function of the form $$T_{mn}(s) = \frac{B_m s^m + B_{m-1} s^{m-1} + \ldots + B_0}{s^n + A_{n-1} s^{n-1} + \ldots + A_0} \quad (m < n) \quad (1)$$

that approximates Y(s), the Laplace transform of y(t) or the desired transfer function. Taking a partial fraction expansion of (1) followed by an inverse Laplace transform allows any temporal function to be approximated by a linear combination of complex sinusoids:

$$T_{mn}(s) = \sum_{i=1}^{n} \frac{R_i}{s - p_i} \Leftrightarrow y_m(t) = \sum_{i=1}^{n} R_i e^{p_i t} \quad (2)$$

where $p_i$ and $R_i$ are the ith pole and its corresponding residue. This approximation can be made to an arbitrary degree of accuracy by adding additional terms in the summation.

The real pole/residue pairs in (2) are realized using the first-order canonical form structure shown in FIG. 3(a). The complex pole/residue pairs occur as complex conjugates and are combined as:

$$T_i(s) = \frac{R_i}{s - p_i} + \frac{R_i^*}{s - p_i^*} \quad (3)$$

$$= \frac{2\text{Re}[R_i]s - 2\text{Re}[p_i R_i^*]}{s^2 - 2\text{Re}[p_i]s + |p_i|^2} = \frac{b_1 s + b_0}{s^2 + a_1 s + a_0}$$

where all the coefficients (b's and a's) are real. These conjugate pairs can thus be realized using the second-order observer canonical form structure shown in FIG. 3(b). Note that an extra $b_2$ block, corresponding to a term $b_2 s^2$ in the numerator, is added in FIG. 3(b) to account for cases like a bandstop notch filter of the form:

$$T_{NF}(s) = \frac{s^2 + \omega_r^2}{s^2 + \omega_r s / Q + \omega_r^2} \quad (4)$$

Figure 4:
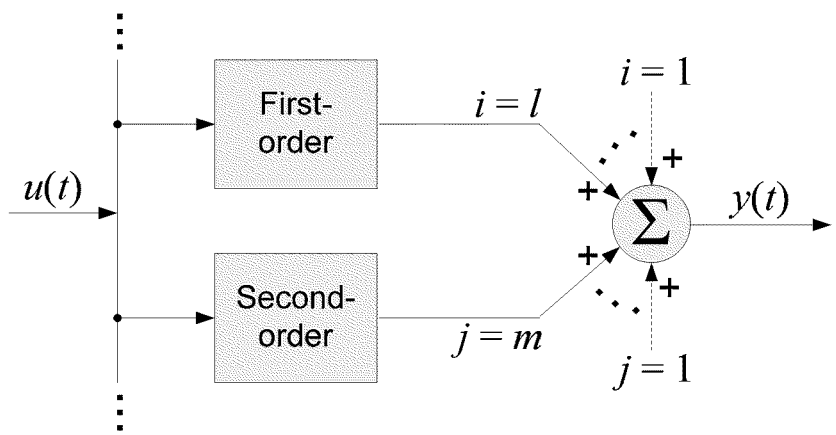
FIG. 4 shows implementation of an arbitrary transfer function

Such first- and second-order structures can then be combined and their outputs summed to realize $T_{mn}(s)$ as shown in FIG. 4.

The architecture shown in FIG. 4 can be realized by implementing various filters, for example, bandpass elliptic filters for channel selection (in MATLAB and/or Electronic Workbench) to validate the analysis.

Cure of Non-Idealities: Pre-Compensation

Figure 5:
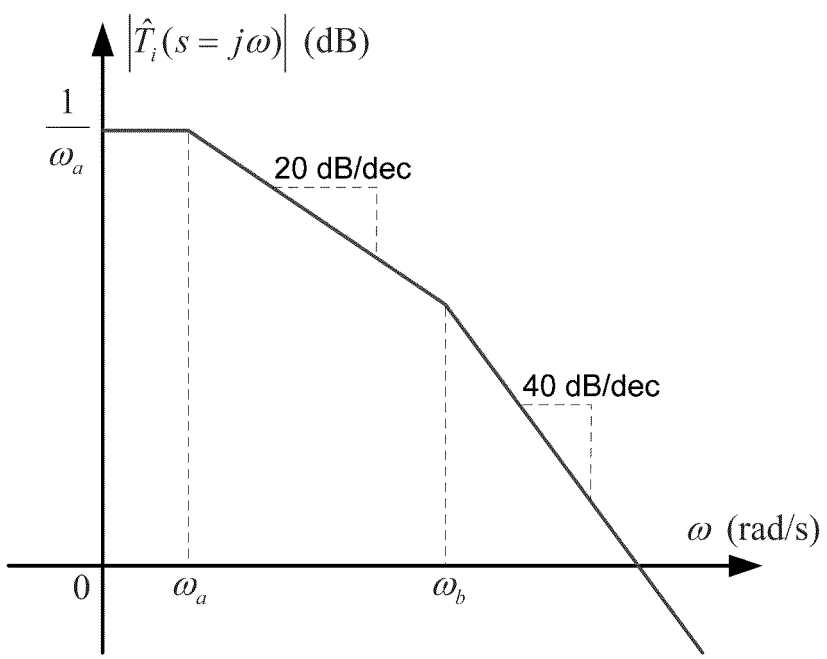
FIG. 5 is a plot of magnitude response of a realistic integrator.

Ideally the integrator block in the previous section has a frequency response of 1/s (i.e., "linear" magnitude response when drawn in the log-log scale). However the magnitude response of a realistic integrator is usually not linear for all frequencies, rather it presents characteristics as shown in FIG. 5 (two-pole model). Instead of 1/s, the transfer function of such an integrator has the following form $$\hat{T}_{int}(s) = \frac{1}{s+\omega_a} \cdot \frac{\omega_b}{s+\omega_b} \quad (5)$$

where $\omega_a$ and $\omega_b$ are poles usually caused by the intrinsic resistances and capacitances of MOS FETs. Correspondingly, the ith term of equation (2) becomes $$\hat{T}_i(s) = \frac{R_i \cdot \frac{1}{s+\omega_a} \cdot \frac{\omega_b}{s+\omega_b}}{1 - p_i \cdot \frac{1}{s+\omega_a} \cdot \frac{\omega_b}{s+\omega_b}} = \frac{R_i \omega_b}{s^2 + (\omega_a+\omega_b)s + (\omega_a - p_i)\omega_b} \quad (6)$$

which in general leads to two poles as shown in FIG. 5:

$$\hat{p}_{i1}, \hat{p}_{i2} = -\frac{\omega_a+\omega_b}{2}\left[1 \mp \sqrt{1 - \frac{4\omega_b(\omega_a - p_i)}{(\omega_a+\omega_b)^2}}\right] \quad (7)$$

Figure 6:
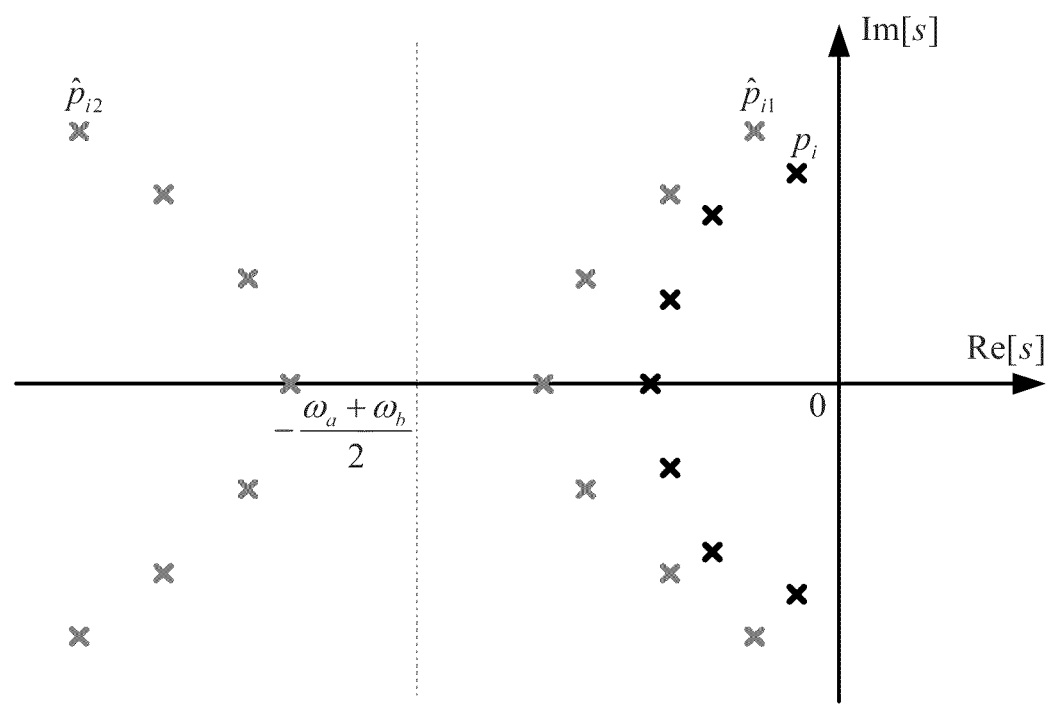
FIG. 6 illustrates pole shifting due to the non-ideal integrator response.
Figure 7:
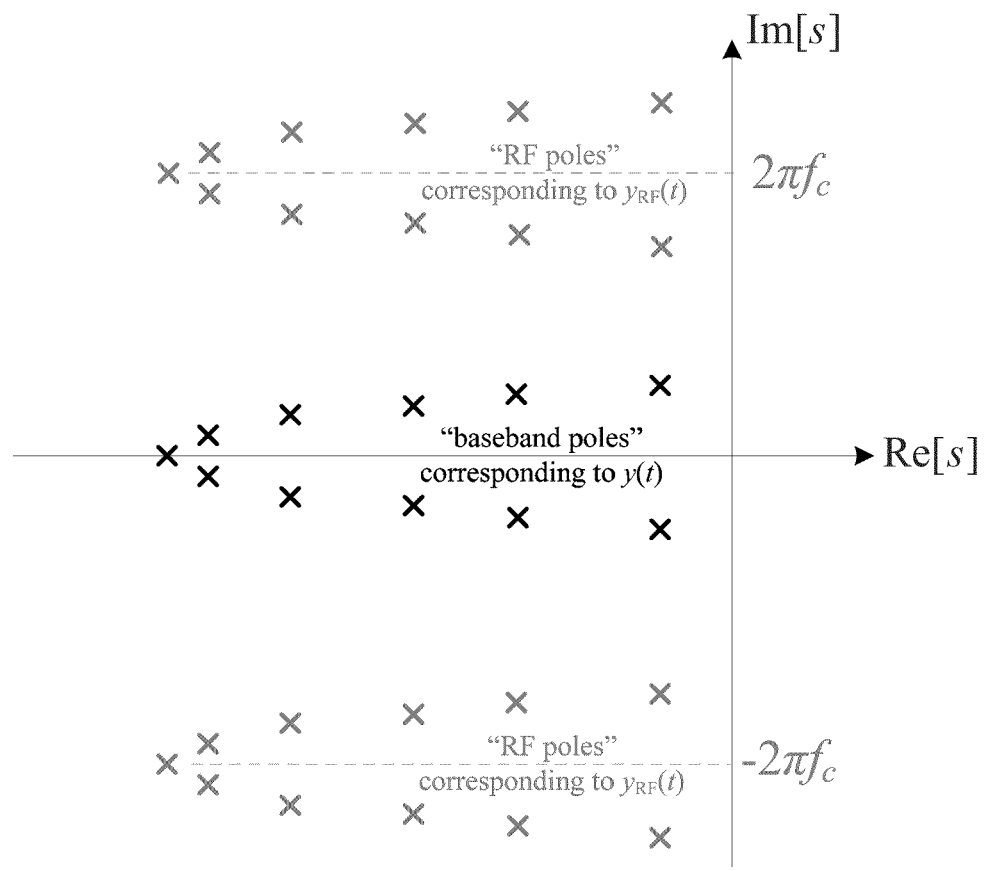
FIG. 7 shows pole plots for the baseband and RF signals.

In FIG. 6, the black crosses (x) represent the desired poles $p_i$ and the red crosses (x) represent the actual poles ($\hat{p}_{i1}$ and $\hat{p}_{i2}$) that can be achieved when a non-ideal integrator is used. Notice that $\hat{p}_{i1}$ and $\hat{p}_{i2}$ are symmetric around the line $\text{Re}[s]=-(\omega_a+\omega_b)/2$.

With the two poles defined in equation (7), a partial expansion of equation (6) can be readily obtained as $$\hat{T}_i(s) = \hat{R}_i\left(\frac{1}{s-\hat{p}_{i1}} - \frac{1}{s-\hat{p}_{i2}}\right) \quad (8)$$

the new residue is given by $$\hat{R}_i = \frac{R_i \omega_b}{\hat{p}_{i1} - \hat{p}_{i2}} = \frac{R_i \omega_b}{\sqrt{(\omega_a+\omega_b)^2 - 4\omega_b(\omega_a - p_i)}} \quad (9)$$

When $\omega_b$ is much larger than $\omega_a$ and $|p_i|$, $\hat{p}_{i1}$ is usually close to the original pole $p_i$ whereas $\hat{p}_{i2}$ is far away and negligible. In order to correct for the deviation due to such a non-ideality, we can preset the pole (denoted by $p_{i,pre}$) such that $\hat{p}_{i1}$ becomes exactly the desired pole $p_i$. That is $$-\frac{\omega_a+\omega_b}{2}\left[1 - \sqrt{1 - \frac{4\omega_b(\omega_a - p_{i,pre})}{(\omega_a+\omega_b)^2}}\right] = p_i \quad (10)$$

which leads to:

$$p_{i,pre} = \omega_a + \frac{\omega_a+\omega_b}{\omega_b}p_i + \frac{1}{\omega_b}p_i^2 \quad (11)$$

With such a preset pole, clearly $\hat{p}_{i1}=p_i$. Correspondingly we have $\hat{p}_{i2}=-(\omega_a+\omega_b)-p_i$. So the actual implementation of the transfer function becomes (substituting into equation (8)):

$$\hat{T}_i(s) = \frac{R_i \omega_b}{2p_i+\omega_a+\omega_b}\left[\frac{1}{s-p_i} - \frac{1}{s+(\omega_a+\omega_b)+p_i}\right] \quad (12)$$

In order to obtain the desired transfer function $T_i(s)$, the residue $R_i$ has to be also preset. It can be easily seen that replacing $R_i$ by $R_{i,pre}=R_i(2p_i+\omega_a+\omega_b)/\omega_b$ makes the first term right, as presented $$\hat{T}_i(s) = \quad (13)$$
$$\frac{R_i}{s-p_i} - \frac{R_i}{s+(\omega_a+\omega_b)+p_i} \Leftrightarrow \hat{y}_i(t) = R_i e^{p_i t} - R_i e^{-(\omega_a+\omega_b+p_i)t}$$

When $\omega_b$ is much greater than $\omega_a$ and $|p_i|$, the second term on the right-hand side is negligible and the desired transfer function is obtained.

Above derivations are only valid for a simple two-pole model. In a real CMOS design, it is not unusual for multiple poles to exist. Furthermore, both left- and right-plane zeros may exist.

CMOS Implementation

The SDR front-end architecture in FIG. 2 allows for the creation of a CMOS chip containing a large number of first- and second-order blocks, whose coefficients can be programmed to realize any transfer function to a specifiable degree of accuracy. The first-order block is actually a special case of the second-order block (when b2=b0=a0=0). Because it is extremely rare for multiple real poles to appear in a realistic filter design (in nearly every case, zero or one first-order block is required), only the second-order blocks (which is referred to as the biquad herein) may be necessary.

Figure 8:
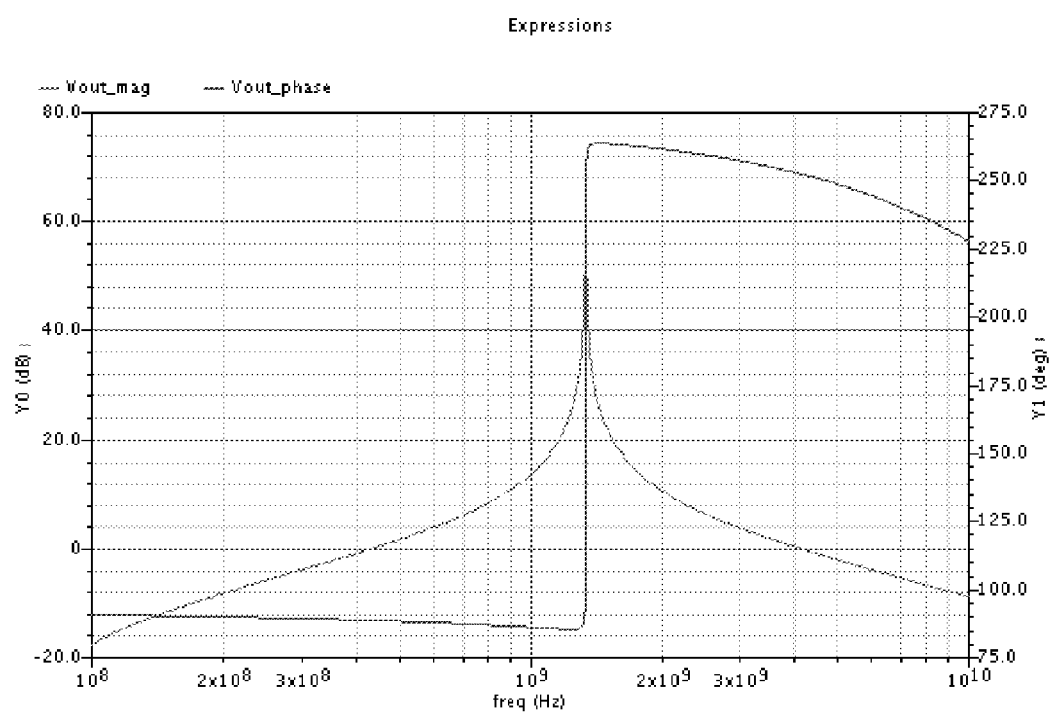
FIG. 8 is a plot of frequency response of a high-Q bandpass filter.

FIG. 8 is a plot illustrating calculated pre-layout simulation results, including frequency response (magnitude and phase), of a high-Q bandpass filter. A UWB RFID transceiver may operates in the frequency range from 3 GHz to 10 GHz. Only single-biquad filters are built for the purpose of identifying and notching out in-band interferers and they are optimized to have high quality values for use in the UWB band only. Example filters carry this research further, solving challenging design issues that arise when implementing systems that require multiple biquads.

An integrator, which is the core component of the biquad circuit, follows the feedforward-regulated cascode operational transconductance amplifier structure. The attenuator (for a and b coefficients) is based on the standard R-2R ladder network that tends to lose accuracy and bandwidth when large source impedance presents.

Components of the SDR front-end of FIG. 2 include programmable processors consisting of multiple second-order differential equation engines, each employing an architecture including one or more state variable filters or biquad circuits. Such architecture and related circuitry may be found in U.S. Pub. No. 2011/0051782, the entirety of which is incorporated by reference. This architecture can implement any desired impulse response or transfer function to a specifiable degree of accuracy by invoking more or fewer engine blocks. Each engine is an analog block containing programmable components, whose parameters are set, controlled, and optimized through algorithms running on a low data rate wideband DSP in the control path to 12 bit accuracy. These engines are implemented as biquad circuits, which are themselves composed of three smaller circuit types: the Integrator, Attenuator, and Summer.

Figure 9:
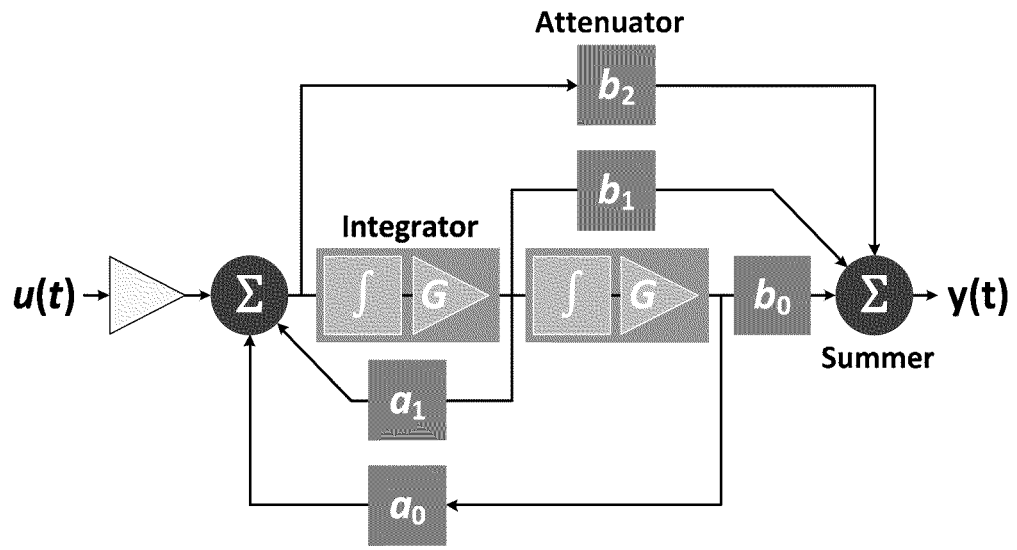
FIG. 9 is a block diagram of a biquad circuit.

FIG. 9 is a block diagram of a biquad circuit. As with the state variable filter of FIG. 3, the biquad circuit may be configured to operate as one or more of the components in the front end circuit of FIG. 2, including the anti-aliasing filters, the bandpass filters, and the transversal filter. Such configuration is described below. A mapping exists between the coefficients of the biquad (a's and b's) and the coefficients of the desired transfer function, while the gain (G) scales the transfer function in frequency. Therefore, adjusting coefficients and the gain parameter alters the filter shape, bandwidth, and center frequency.

The fundamental components of the biquad are the integrator, attenuator, and summer. A broadband self-tuned integrator using feedforward-regulated topology has been constructed. This integrator has a high bandwidth, high linearity and low intermodulation distortion which make it suitable especially for applications at microwave frequencies. The characteristics of the biquad output y(t) can be changed by altering the transfer function, T(s), of the biquad. This is achieved by changing the values of the attenuators, which are comprised of $a_0$, $a_1$, $b_o$, $b_1$ and $b_2$. The center frequency of the transfer function is swept by changing the gain G of the integrators. The values of the attenuators and the gain of the integrators may be digitally controlled by a Serial Peripheral Interface (SPI), which has 12-bit accuracy.

Figure 10:
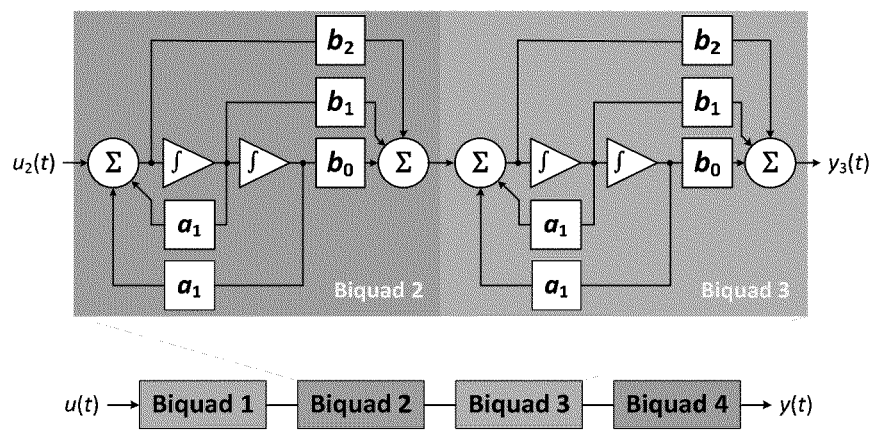
FIG. 10 is a block diagram of a plurality of cascaded biquad circuits.

FIG. 10 is a block diagram of a plurality of biquad circuit in a cascaded configuration, demonstrating how the biquad acts as a fundamental building block whose series constructions implement circuits of arbitrary function and order. This architecture allows for a programmable and dynamic implementation of any specified filter and transfer function.

Figure 11:
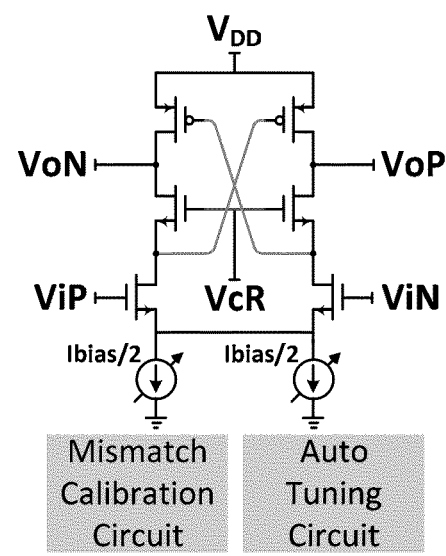
FIG. 11 is a circuit diagram of an integrator circuit.

FIG. 11 is a circuit diagram of an integrator circuit illustrates an integrator circuit that may be implemented in the biquad circuits of FIGS. 9 and 10. The integrator is a broadband self-tuned integrator using feedforward-regulated topology. The integrator has a high bandwidth, high linearity and low intermodulation distortion which make it suitable especially for applications at microwave frequencies.

Small signal analysis shows that the transfer function of this circuit is of the form:

$$T(s) = \frac{\Omega_0 \cdot (s/z_1 - 1) \cdot (s/z_2 - 1)}{s \cdot (s/p + 1) + a_0}$$

where $$z_1 = \frac{g_{m1}}{C_{gd1}}$$

$$z_2 = \frac{(g_{m3} + 1/R)}{C_{gd3}}$$

$$\Omega_0 = \frac{g_{m1} \cdot (g_{m3} + 1/R)}{(C_{gs3} + C_{gd3} + C_{gd1} + C_{ds1}) \cdot (g_{ds3} + 1/R) + (C_{gd3} + C_{ds3}) \cdot (g_{ds1} + 1/R) + C_{gd3} \cdot (g_{m3} + 2/R)}$$

$$p = \frac{(C_{gs3} + C_{gd3} + C_{gd1} + C_{ds1}) \cdot (g_{ds3} + 1/R) + (C_{gd3} + C_{ds3}) \cdot (g_{ds1} + 1/R) + C_{gd3} \cdot (g_{m3} + 2/R)}{(C_{gs3} + C_{gd3} + C_{gd1} + C_{ds1}) \cdot (C_{gd3} + C_{ds3}) - C_{gd3}^2}$$

$$a_0 = \frac{(g_{ds1} + 1/R) \cdot (g_{ds3} + 1/R) - (g_{m3} + 1/R)/R}{(C_{gs3} + C_{gd3} + C_{gd1} + C_{ds1}) \cdot (g_{ds3} + 1/R) + (C_{gd3} + C_{ds3}) \cdot (g_{ds1} + 1/R) + C_{gd3} \cdot (g_{m3} + 2/R)}$$

The resistor R is usually chosen to be small compared to $1/g_{m1}$, $1/g_{m3}$, $1/g_{ds1}$, and $1/g_{ds3}$. For deep submicron CMOS technology (for example 130 nm or below), it is usually true that $C_{gs}$ dominates all the parasitic capacitance. In view of this, we have:

$$z_1 > \frac{g_{m1}}{C_{gs1}} \approx 2\pi \cdot f_T$$

$$z_2 > \frac{1}{R \cdot C_{gd3}}$$

$$p \approx \frac{1}{R \cdot C_{gd3}}$$

with $f_T$ being the unity gain frequency which is usually large. For small R, $z_2$ and p are usually very large. The transfer function can hence be approximated as $$T(s) = \approx \frac{\Omega_0}{s + a_0}$$

Note that $a_0$=0 if R is chosen to be $$R = \frac{g_{m3} - g_{ds1} - g_{ds3}}{g_{ds1} \cdot g_{ds3}}$$

This further simplifies the transfer function to $$T(s) \approx \frac{\Omega_0}{s}$$

which is exactly the response of a perfect integrator. Note that the transistors are usually chosen such that $g_{m1} > g_{m3}$ hence $$\Omega_0 \approx \frac{g_{m1}}{C_{gs3}} > \frac{g_{m3}}{C_{gs3}} \approx 2\pi \cdot f_T$$

This implies that the unity gain frequency of the integrator is approximately the same as that of the technology.

Figure 12A:
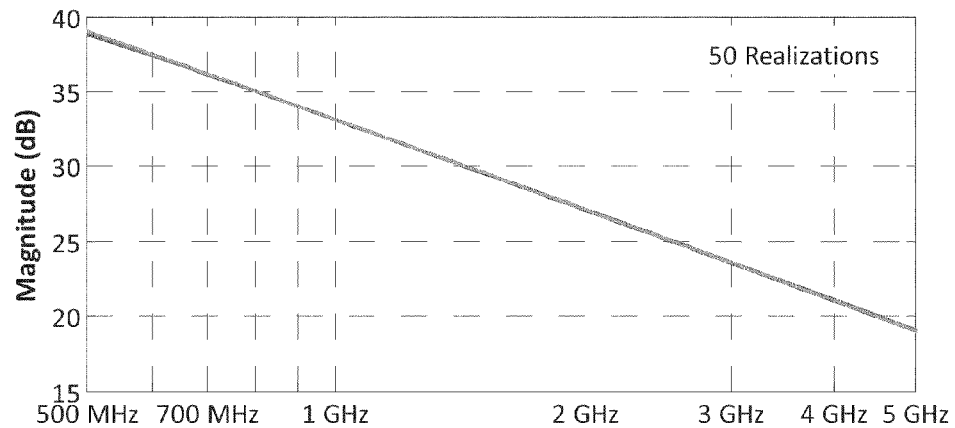
FIGS. 12A-B are plots illustrating magnitude and phase response of an integrator circuit.
Figure 12B:
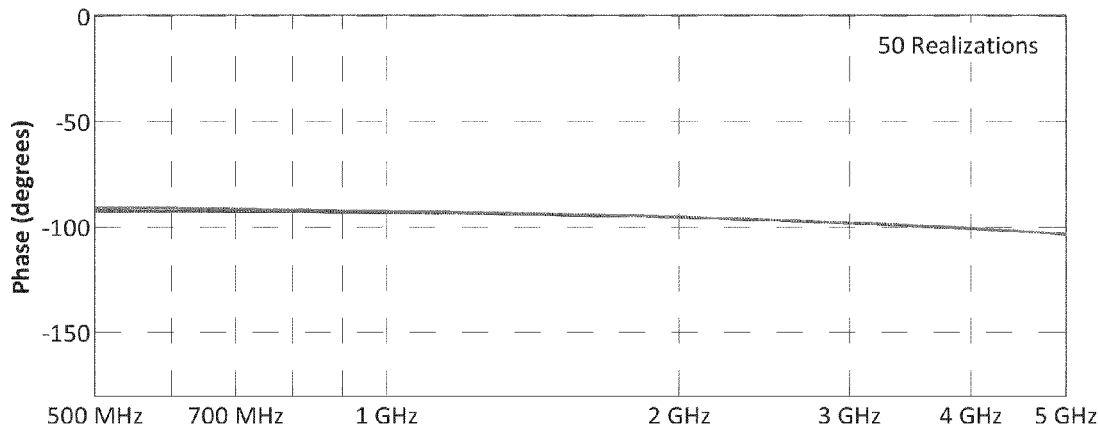

FIGS. 12A-B illustrate the frequency response of the integrator as implemented in TSMC's 65 nm CMOS. The unity frequency is about 60 GHz. The magnitude has 20 dB/dec of roll off from about 10 MHz to 60 GHz while the phase is approximately −90° (within ±10°) from 50 MHz to 10 GHz.

Figure 13:
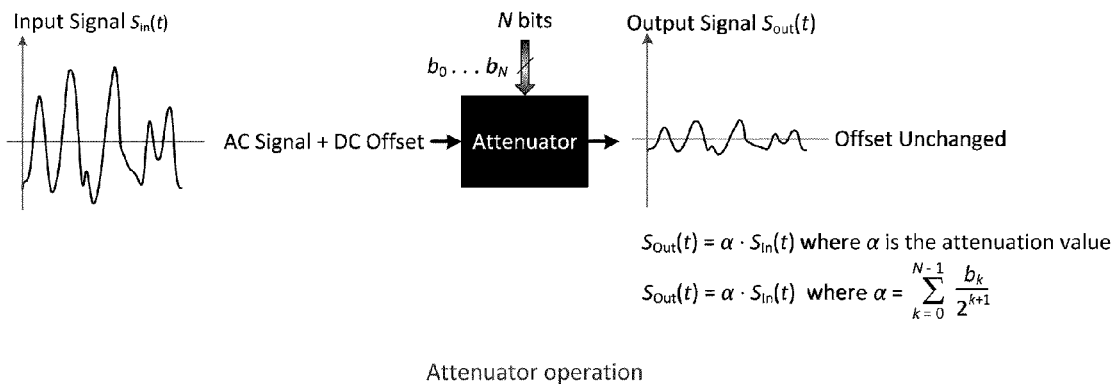
FIG. 13 is a diagram illustrating operation of an attenuator circuit.

FIG. 13 illustrates a "linear in voltage" attenuator with respective input and output signals. Attenuators are devices that reduce a signal in proportion to a given binary number specified by a processor or DSP. They are designed to be either "linear in voltage" or "linear in dB." A "linear in dB" attenuator is similar to a "linear in voltage" attenuator, except the attenuation is carried out in dBs. Attenuator precision is 12 bits.

Figure 14:
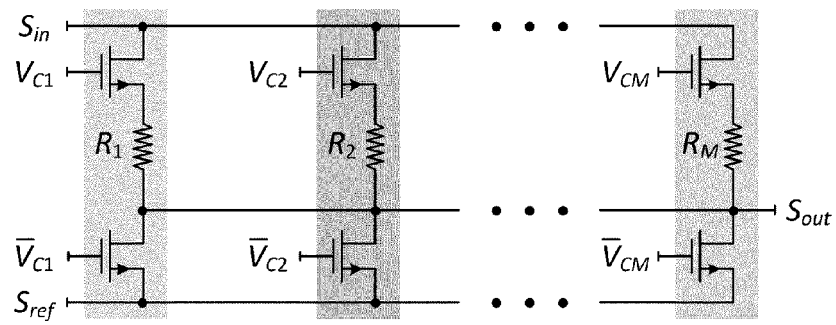
FIG. 14 is a circuit diagram of a 12-bit attenuator.

FIG. 14 shows a block diagram of the attenuator. A summing circuit that consists of a single resistor R and N transistors has been created. The proposed summing block can be used in circuit topologies that require broadband analog signal processing. The number of transistors N is determined by the number of input signals that will be summed.

The M bit (in this example M=24) attenuator provides N bit (in this example N=12) accuracy. The maximum resistor (and hence FET switch) ratio is approximately 64. Initially resistors R, 2R, 4R, 8R, 16R, 32R, 64R may be used, and resistors of value 59R, 53R, 47R, 43R, 41R, 37R, 31R may be added, where the numbers 59, 47, 43, 41, 37, 31 are prime to the numbers 2, 4, 8, 16, 32, and 64. The resulting distribution is dithered to get the best possible distribution (maximum range of fill) in the 2N bins using x=5%. Resistors of value R may be added until we have M resistors (here we add 10 resistors of value R).

Figure 15A:
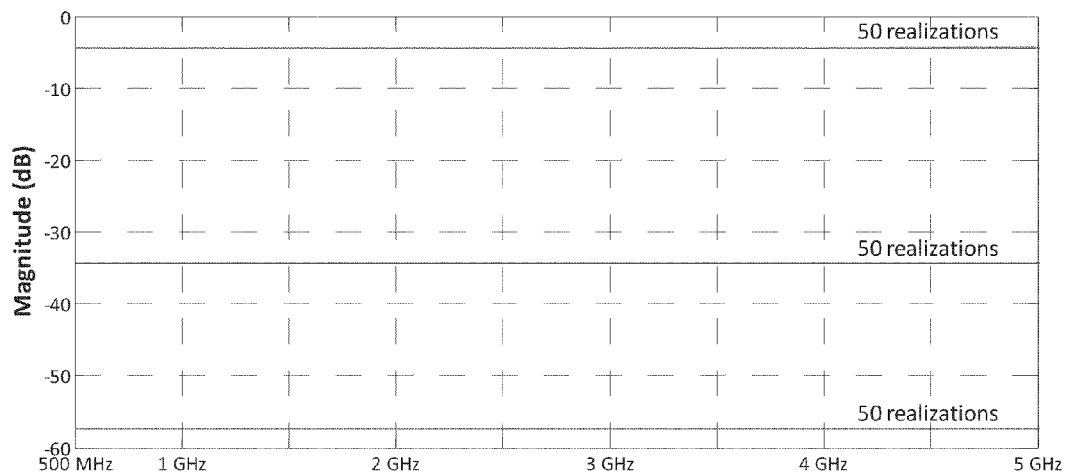
FIGS. 15A-B are plots illustrating magnitude and phase response of an attenuator circuit.
Figure 15B:
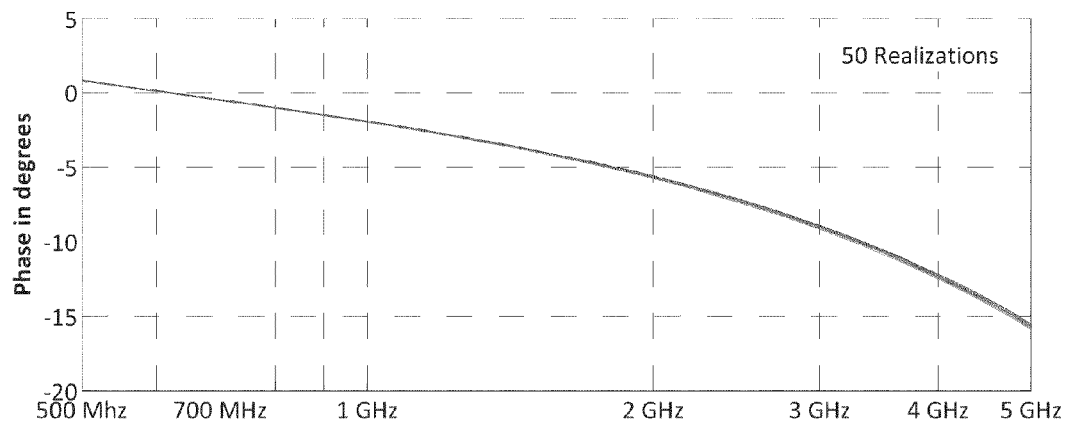

FIGS. 15A-B illustrate the frequency domain performance of the attenuator for a specific loss pattern. In general, the attenuator exhibits greater than 10 GHz of bandwidth at all other attenuation values.

Figure 16:
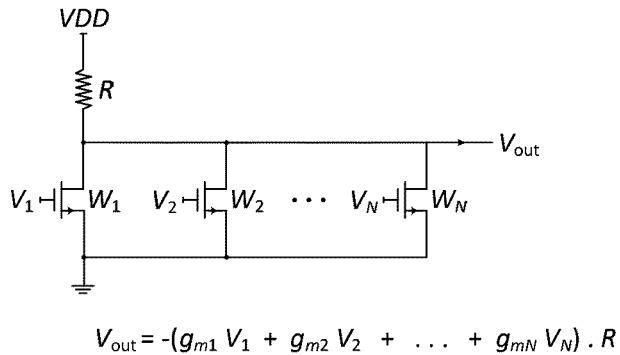
FIG. 16 is a circuit diagram of a summer circuit.

FIG. 16 illustrates a summer circuit that may be implemented in the biquad circuit described above with reference to FIG. 9. The summing circuit comprises a single resistor R and N transistors. The summer can be used in circuit topologies that require broadband analog signal processing. The number of transistors N is determined by the number of input signals that will be summed.

The summer receives input signals $V_1, V_2, \ldots, V_N$, and provides output signal $V_{out}$, all of which contain the DC and the AC terms. The resistor R sets the DC current through the summing network and contributes to the overall gain of the summing block. By using superposition and therefore taking into account one transistor at the time, we are left to analyze a common source (CS) amplifier. By ignoring the DC bias term at the output and focusing only on the AC term, the output for CS amplifier is given by $$v_o = -g_m v_{in}(R\|r_o).$$  Equation 1

In Equation 1, term $g_m$ is the gain of the transistor (i.e., transconductance) and $r_o$ is the output resistance of the transistor. Assuming that $r_o \gg R$ the overall output of the circuit in FIG. 1 is given by $$v_{out} = -(g_{m1}v_1 + g_{m2}v_2 + \ldots + g_{mN}v_N)R$$  Equation 2

In Equation 2, the $g_m$ terms that accompany the input signals can be viewed as the summing coefficients. Because the resistor R is fixed, we can adjust the summing coefficients by changing the transistor gain $g_m$. The transistor gain $g_m$ can be expressed in terms of the transistor width W, $$g_m = \mu_n C_{ox} \frac{W}{L}(V_{GS} - V_{TN}).$$  Equation 3

According to Equation 3, the transistor gain is directly proportional to the transistor width and therefore by varying the transistor width we can adjust the summing coefficients. The bandwidth of the summing circuit is determined by the CS amplifier bandwidth.

Figure 17A:
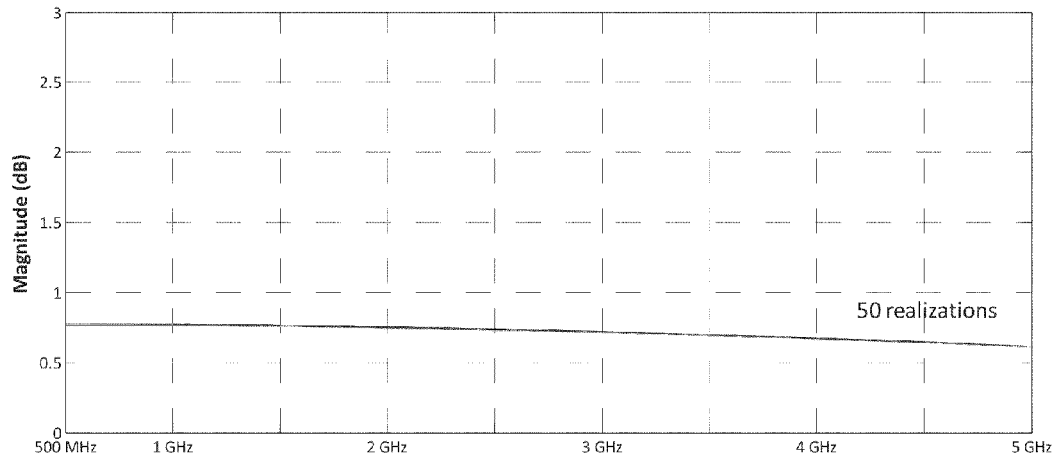
FIGS. 17A-B are plots illustrating magnitude and phase response of a summer circuit.
Figure 17B:
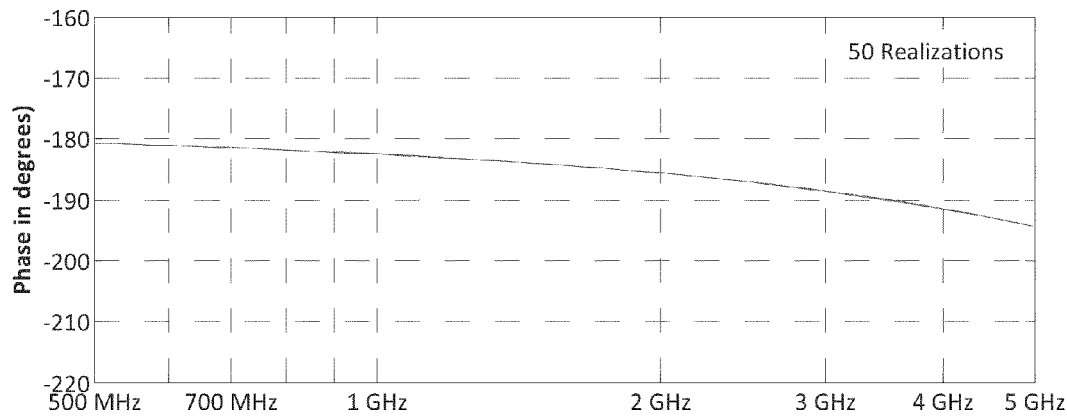

FIGS. 17A-B illustrate the frequency response of the summer as implemented in TSMC's 65 nm CMOS.

While this invention has been particularly shown and described with references to example embodiments thereof, it will be understood by those skilled in the art that various changes in form and details may be made therein without departing from the scope of the invention.

What is claimed is:

1. A circuit comprising: a frequency synthesizer configured to provide a clock signal having a variable frequency; a transmit path including: a first anti-aliasing filter for receiving an analog signal; an upconverter configured to upconvert an output of the anti-aliasing filter according to the clock signal; and a first programmable bandpass filter configured to filter an output of the upconverter; and a receive path comprising: a second programmable bandpass filter configured to filter a received signal; a downconverter configured to downconvert an output of the anti-aliasing filter according to the clock signal; and a second programmable anti-aliasing filter configured to filter an output of the downconverter; and
   one or more of the first and second anti-aliasing filters, first and second bandpass filters and the transversal filter include at least one programmable biquad circuit;
   the biquad circuit includes at least one attenuator, at least one integrator and at least one summer; and
   at least one attenuator includes: a plurality of M attenuator blocks, each block comprising: a first switch connected between a signal rail and an output node; a second switch connected between an offset rail and the output node; and a resistive element connected in series between the output node and the first and second switches; the attenuator providing N-bit accuracy, wherein N is less than M.

2. The circuit of claim 1, further comprising a programmable transversal filter configured to receive an output of the first programmable bandpass filter and a signal corresponding to the received signal, the programmable transversal filter providing echo cancellation of the transmit signal from the received signal.

3. The circuit of claim 1, further comprising a combiner circuit in the receive path, the combiner circuit configured to combine the received signal with an output of the transversal filter.

4. The circuit of claim 1, further comprising a balanced hybrid circuit at both the transmit path and receive path, the balanced hybrid circuit configured to provide electrical symmetry between the transmit path and the receive path.

5. The circuit of claim 1, wherein the balanced hybrid circuit is further configured to limit transfer of energy from the transmit path to the receive path.

6. The circuit of claim 1, further comprising a roofing filter in the receive path, the roofing filter configured to limit a frequency of the received signal to a selected bandwidth.

7. The circuit of claim 1, wherein the at least one integrator includes: first and second p-channel transistors including respective sources coupled in parallel to a first voltage supply terminal and respective drains configured to provide complementary output signals; first and second variable resistors including respective first terminals coupled to the drains of the first and second p-channel transistors, respectively, and respective second terminals coupled to gates of the second and first p-channel transistors, respectively; and first and second n-channel transistors including respective drains coupled to the second terminals of the first and second variable resistors, respectively, respective gates configured to receive complementary input signals, and respective sources in electrical communication with a second voltage supply terminal.

8. The circuit of claim 1, wherein the at least one summer includes: a plurality of N switches connected in parallel between an output node and a ground rail; and a resistive element connected in series between a source rail and the output node; each of the switches being controlled by a respective voltage input.

* * * * *